United States Patent [19]
Kelley

[11] Patent Number: 5,313,238
[45] Date of Patent: May 17, 1994

[54] CAMERA FOCUS ADJUSTMENT MECHANISM

[75] Inventor: James P. Kelley, Milpitas, Calif.

[73] Assignee: VLSI Technology, Inc., San Jose, Calif.

[21] Appl. No.: 798,299

[22] Filed: Nov. 22, 1991

[51] Int. Cl.$^5$ .............................................. G03B 1/18
[52] U.S. Cl. ................................................. 354/195.1
[58] Field of Search ................... 354/62, 74, 76, 79, 354/80, 81, 187, 189, 191, 195.1, 195.12, 202, 286, 293

[56] References Cited

U.S. PATENT DOCUMENTS

| | | | |
|---|---|---|---|
| 1,447,173 | 3/1923 | Elms | 354/195.1 |
| 1,621,935 | 3/1927 | Kroedel et al. | 354/195.1 |
| 5,077,154 | 12/1991 | Corley | 354/120 |

Primary Examiner—David M. Gray
Attorney, Agent, or Firm—Hickman & Beyer

[57] ABSTRACT

A camera focus adjustment mechanism characterized by a base assembly, a clamping assembly, and a screw mechanism coupling the base assembly to the clamping assembly. The clamping assembly includes a carriage plate and a clamping plate, where the carriage plate is coupled to the screw mechanism and the clamping plate is adjustably coupled to the carriage plate. The clamping plate firmly clamps around the barrel of a camera lens assembly, and is adjustable relative to the carriage plate in a direction substantially perpendicular to the focusing axis of the camera lens assembly. The focus of the camera lens assembly is adjusted by rotating the screw mechanism to cause the clamping assembly (and therefore the barrel of the camera lens assembly) to move in a direction parallel to the focusing axis.

16 Claims, 4 Drawing Sheets

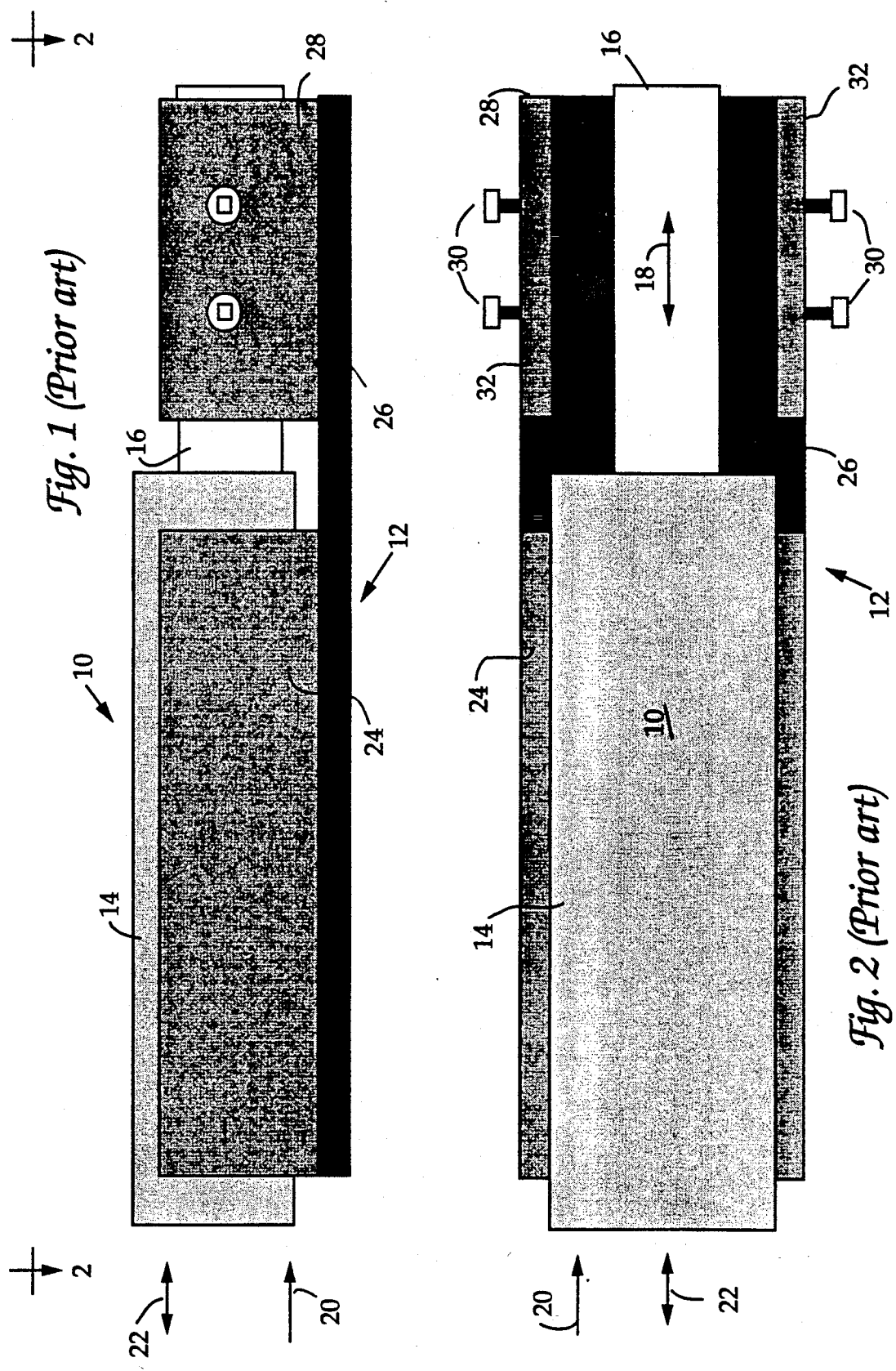

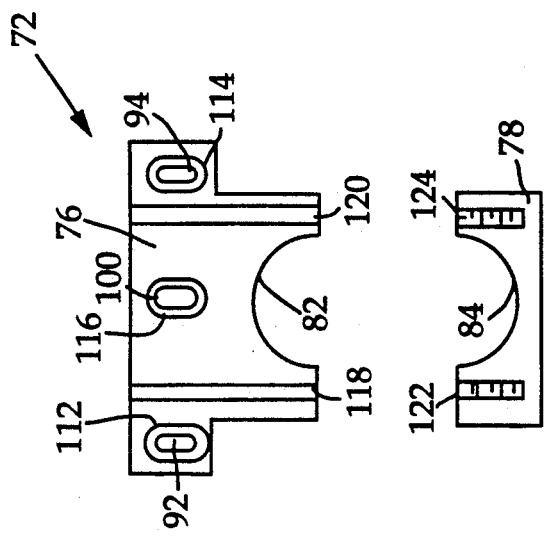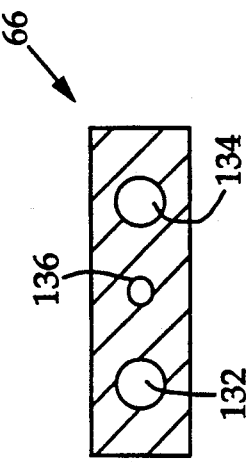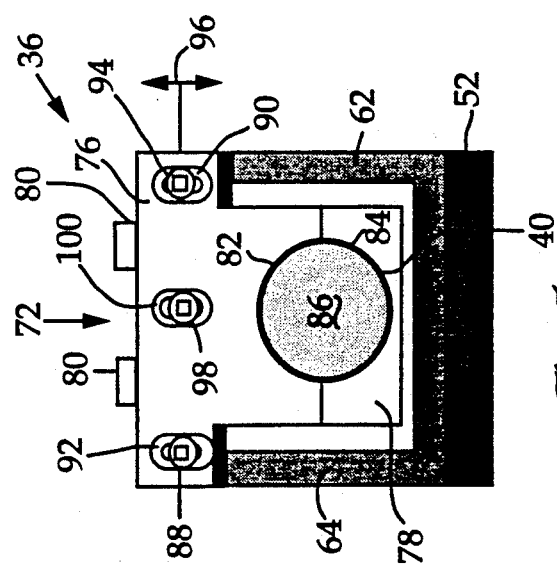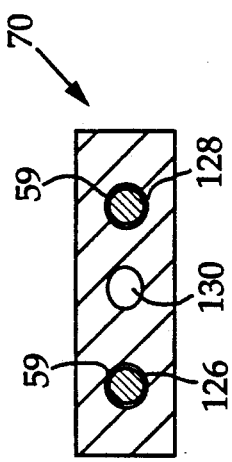

CAMERA FOCUS ADJUSTMENT MECHANISM

BACKGROUND OF THE INVENTION

This invention relates generally to video cameras, and more particularly to focusing mechanisms for video cameras.

Compact video cameras are available from a variety of manufacturers. For example, such cameras are available from Sony and JVC of Japan. Some models, such as the model TM-540 black-and-white video camera made by Pulnix, are used in manufacturing and inspection equipment to provide a visual input to the equipment.

In FIGS. 1 and 2, a prior art video camera 10 is coupled to a base assembly 12 and includes a main body 14 and a lens assembly enclosed within a barrel 16. As illustrated in FIG. 2, the barrel 16 may slide into and out of the main body 14 along a focusing axis 18 to vary the focus of the lens assembly. An optical detector and video camera electronics (not shown) are located within the main body 14 of the video camera 10. The detector and video camera electronics are powered by a power line 20, and video and control signals are carried on a bus 22.

The main body 14 of the video camera 10 is affixed to the base assembly 12 by engaging the main body 14 with a first U shaped channel member 24 which is affixed to a base plate 26. This engagement can be by a tight compression fit of the main body 14 within the channel shaped member 24, or it may be accomplished by set screws, adhesives, or other fastening techniques. The barrel 16 extends into a second U shaped channel member 28 (which is also affixed to base plate 26) and can move back and forth within the channel member along the aforementioned focusing axis 18. The position of the barrel 16 can be fixed by tightening set screws 30 which extend through threaded bores provided in the sidewalls 32 of the channel member 28.

To focus the lens assembly of the video camera 10, the set screws 30 are loosened and the barrel 16 is moved back and forth along focusing axis 18 until the lens assembly is properly focused on the optical detector of the video camera. The set screws 30 are then re-tightened to engage barrel 16 and fix its position along the focusing axis 18.

There are several problems encountered with this focusing system. For one, it is difficult to accurately move the barrel 16 by hand to provide a proper focus. For applications requiring a very accurate focus, such as integrated circuit lead inspection, the barrel often needs to be positioned as accurately as 20/1000th of an inch to properly focus the lens assembly. Another problem is that each time the set screws 30 engage the barrel 16 they form indentations in the barrel. These indentations can make it difficult to properly fix the position of the barrel 16 after its position has been re-adjusted because the set screws 30 tend to reengage with these indentations. There is also the possibility that the barrel 16 and the camera lens assembly can be damaged by over-tightening the set screws 30.

SUMMARY OF THE INVENTION

A camera focus adjustment mechanism in accordance with the present invention includes a base assembly, a clamping assembly for clamping a barrel of a camera lens assembly, and a screw mechanism coupling the clamping assembly to the base assembly. Rotation of the screw mechanism causes the clamping assembly to move in a direction parallel to the focusing axis of the camera lens assembly, thereby providing accurate control of the focus of the camera lens assembly. The clamping assembly preferably includes a carriage plate and a clamping plate, where the carriage plate is connected to the screw mechanism and the clamping plate is adjustably mounted on the carriage plate. The clamping plate is formed in two sections which clamp around the barrel of the camera lens assembly. The position of the clamping plate relative to the carriage plate is adjustable in a direction substantially perpendicular to the focusing axis.

A method in accordance with the present invention involves engaging a screw mechanism with a base assembly and a clamping assembly, positioning a barrel of a camera lens assembly parallel to an axis of rotation of the screw mechanism, engaging the barrel with the clamping assembly, and rotating the screw mechanism to move the barrel and thereby adjust the focus of the camera lens assembly.

The screw mechanism of the present invention is a far more accurate method of positioning the barrel of the camera lens assembly than the manual positioning method of the prior art. The clamping assembly firmly holds the barrel of the lens assembly without any damage to the barrel and, therefore, the barrel can be accurately re-positioned time after time.

These and other advantages of the present invention will become apparent to those skilled in the art upon a reading of the following specification of the invention and a study of the several figures of the drawing.

BRIEF DESCRIPTION OF THE DRAWINGS

FIG. 1 is a side elevational view illustrating a video camera and camera focus adjustment mechanism of the prior art;

FIG. 2 is a top plan view taken along line 2—2 of FIG. 1;

FIG. 5 is an end elevational view taken along line 5—5 of FIG. 3;

FIG. 7 is a cross-sectional view taken along line 7—7 of FIG. 6;

FIG. 8 is a cross-sectional view taken along line 8—8 of FIG. 6; and

FIG. 9 is a cross-sectional view taken along line 9—9 of FIG. 6.

DETAILED DESCRIPTION OF THE PREFERRED EMBODIMENTS

Figure 3:
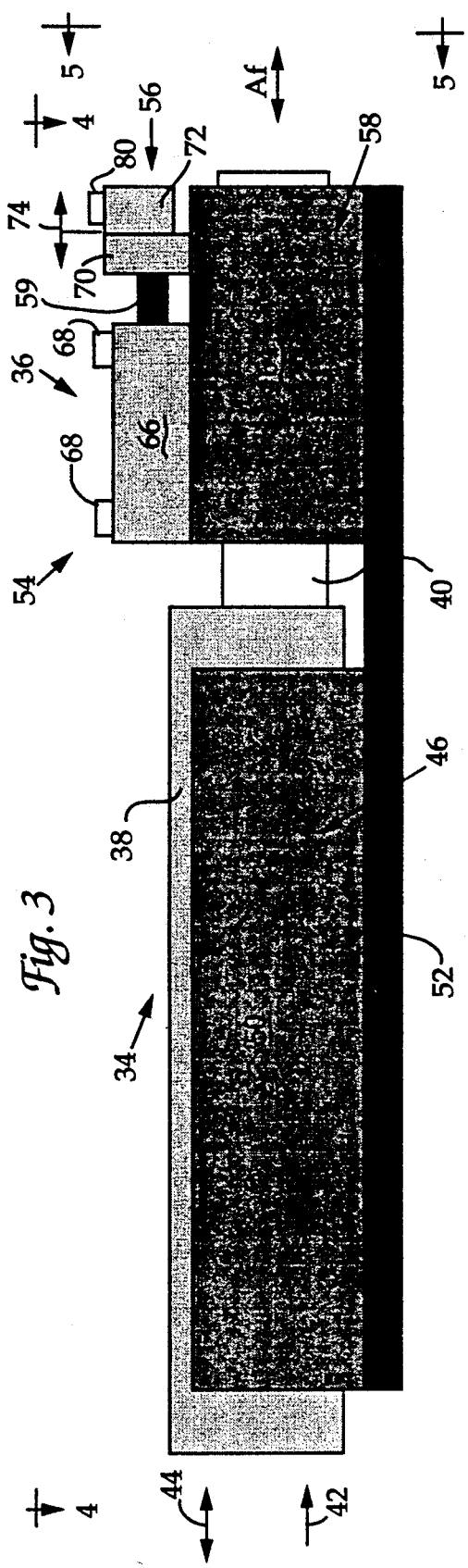
FIG. 3 is a side elevational view illustrating a video camera and camera focus adjustment mechanism in accordance with the present invention.
Figure 4:
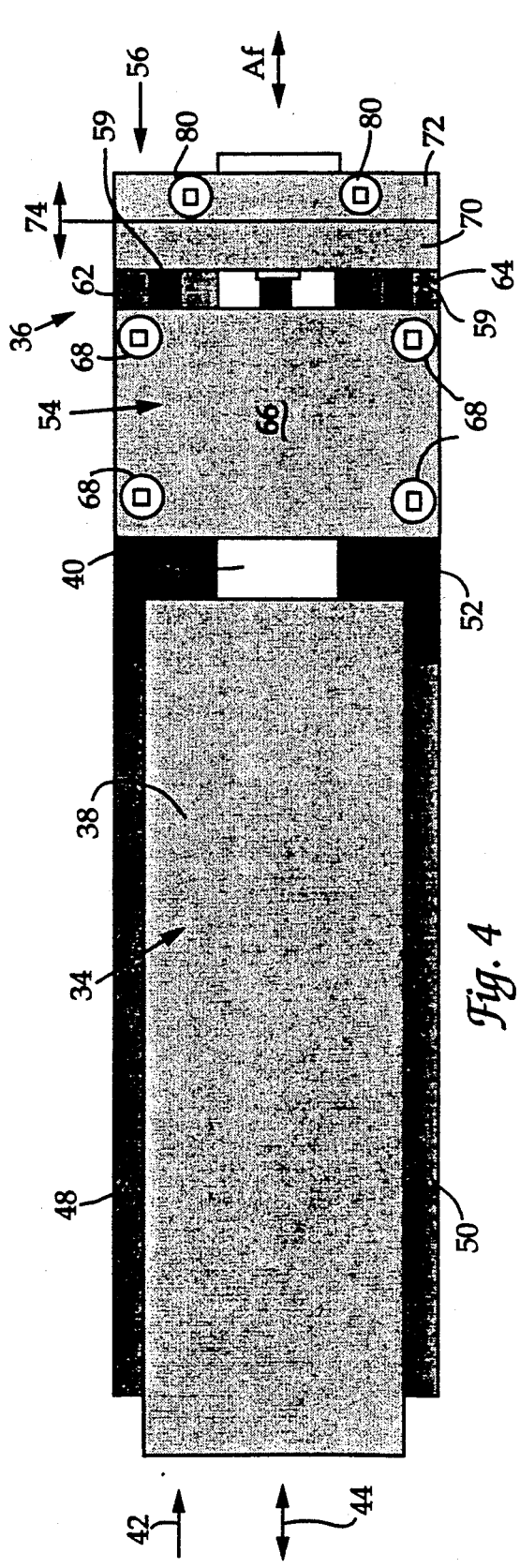
FIG. 4 is a top plan view taken along line 4—4 of FIG. 3.

A prior art video camera and camera focus adjustment mechanism was discussed with reference to FIGS. 1 and 2. A video camera 34 and camera focus mechanism 36 in accordance with the present invention is illustrated in FIGS. 3-9. With particular reference to FIGS. 3 and 4, video camera 34 includes a main body 38 and a barrel 40 which houses a camera lens assembly. An optical detector and video camera electronics (not shown) are located within the main body 38 and are powered by a power line 42. Video and control signals may be carried on a control bus 44 of the video camera 34. The video camera 34 preferably comprises a high contrast, black-and-white video camera such as the aforementioned model TM-540 video camera made by Pulnix.

The camera body 38 is engaged with a first U shaped channel member 46 having a base (not seen) and a pair of sidewalls 48 and 50. The body 38 may be held in place by a tight compression fit between the sidewalls 48 and 50, or some other means of affixing the body 38 such as set screws, adhesives, etc. may be used. The base of the channel member 46 is, in turn, attached to a base plate 52 by some appropriate means such as machine screws (not shown). The barrel 40 may slide in and out of the camera body 38 along a focusing axis $A_f$ to change the focus of the camera lens assembly.

The focus adjustment mechanism 36 includes a base assembly 54, a clamping assembly 56, a screw mechanism 57 having an axis of rotation $A_s$ which is parallel to the focusing axis $A_f$, and a pair of guides 59. The base assembly 54 includes a second U shaped channel member 58 having a base portion 60 and two sidewalls 62 and 64, and a support member 66 attached to the top of sidewalls 62 and 64 with machine screws 68. The clamping assembly 56 includes a carriage plate 70 and a clamping plate 72. The carriage plate 70 is coupled to the support member 66 by screw mechanism 77, and the clamping plate 72 is coupled to the carriage plate 70. The bottom of the carriage plate 70 rests upon the upper ends of sidewalls 62 and 64 and can slide back and forth as indicated by the arrows 74.

FIG. 5 is an end elevational view of the focus adjustment mechanism 36 and, more particularly, of the clamping plate 72. The clamping plate includes a first section 76 and a second section 78 held together with two machine screws 80. A bottom edge of section 76 is provided with a first recess 82, and a top edge of section 78 is provided with a second recess 84. When the first section 78 and the second section 78 are abutted together, the recesses 82 and 84 cooperate to form a circular aperture which is slightly smaller in diameter than the barrel 40. A lens 86 of the camera lens assembly can be seen from this view.

FIG. 5 also shows a pair of set screws 88 and 90 which have threaded shafts extending through slots 92 and 94, respectively, in first section 76 to engage threaded bores in the carriage plate 70. When the set screws 88 and 90 are loosened, the clamping plate 72 can move up and down as indicated by arrows 96 in a direction substantially perpendicular to the focusing axis $A_f$. This permits the height of the clamping plate 72 to be adjusted so that the recesses 82 and 84 of the clamping plate are properly positioned around barrel 40 of the camera lens assembly. This important alignment feature permits the camera focus mechanism 36 to adapt to variations in the position of the barrel 40 of the video camera 38 due to different mounting techniques, slightly different camera models, etc. and to allow for slight variations in the construction of the camera focus mechanism.

Also seen in FIG. 5 is a focus adjustment screw 98 which has a threaded shaft which extends through a slot 100 in the first section 76. This adjustment screw forms a part of the screw mechanism 57 which is used to adjust the focus of the video camera 34. The operation of the screw mechanism 57 will be discussed in greater detail subsequently.

Figure 6:
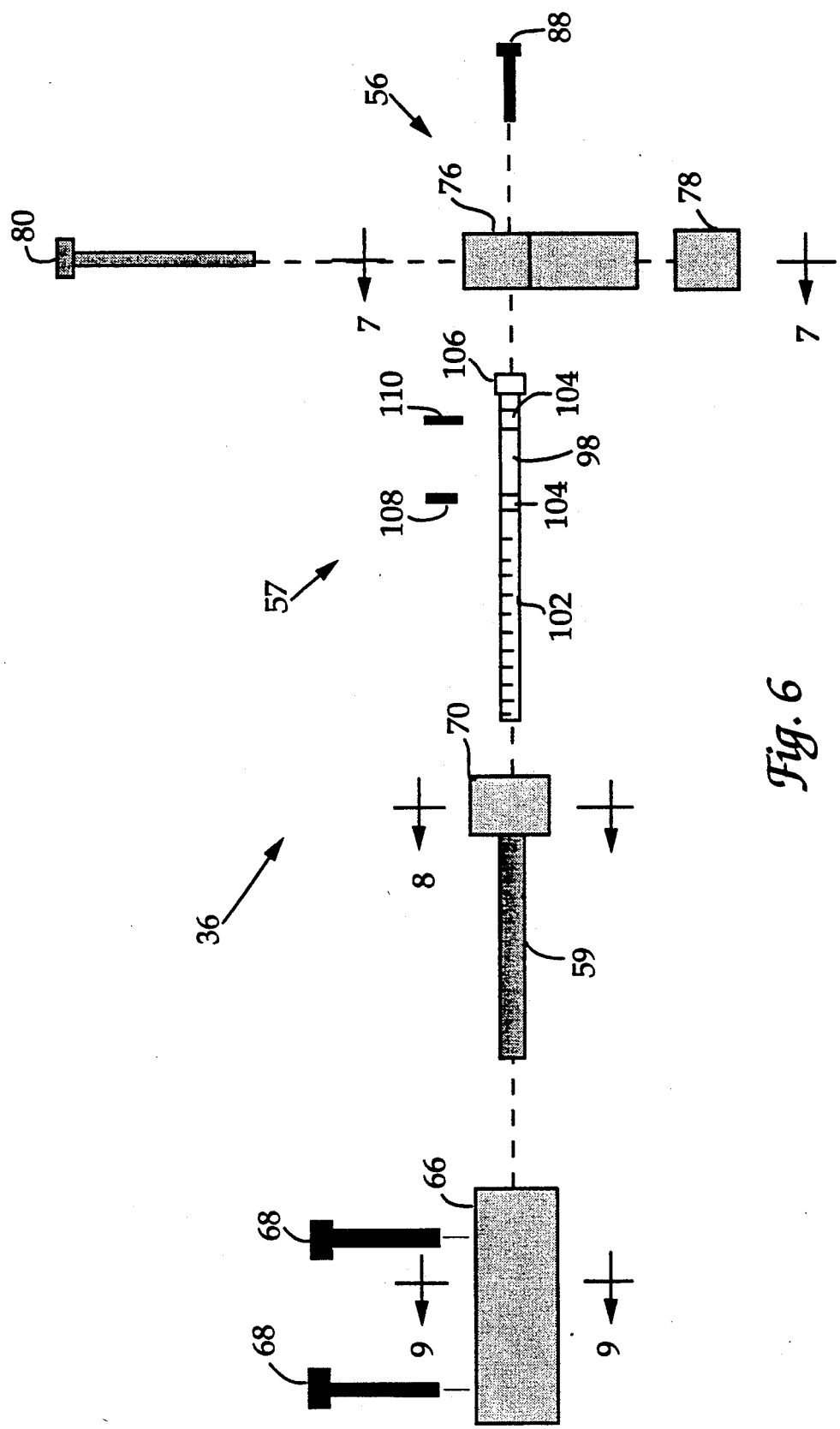
FIG. 6 is an exploded, side elevational view of the camera focus adjustment mechanism of FIGS. 1-5.

In FIG. 6, the focus adjustment mechanism 36 is shown in an exploded view. As mentioned previously, the screws 68 are used to attach the support member 66 to the sidewalls 62 and 64 of the channel member 58. The guides 59 are preferably cylindrical pins which extend into bores provided in support member 66. The focus adjustment screw 98 extends through an aperture in carriage plate 70. The shaft of focus adjustment screw 98 includes a threaded portion 102 which engages a threaded bore in support member 66, and a pair of grooves 104 formed around a portion of the screw's shaft near a head 106.

The screw mechanism 57 includes the focus adjustment screw 98 and a pair of retaining clips 108 and 110 which engage with the grooves 104 of the screw 98. A first retaining clip 108 is positioned on the left side of carriage plate 70 and a second retaining clip 110 is positioned on the right side of carriage plate. The portion of the shaft of screw 98 between the groove 104 is free to rotate within a bore provided through the carriage plate 70. When the screw 98 is rotated in a clockwise direction, it screws into the threaded bore in the support member 66 and the retaining clip 110 pushes against the right side of the carriage plate 70, forcing the plate towards the support member 66. When the screw 98 is rotated in a counter-clockwise direction, it screws out of the threaded bore of the support member 66 and the retaining clip 108 pushes against the left side of the carriage plate 70, forcing the plate away from the support member 66.

The clamping assembly 56 separates into first section 76 and second section 78 when the screws 80 are removed. The first section 76 adjustably attaches to the carriage plate 70 by screws 88 as described previously. The head 106 of the focus adjustment screw 98 is accessible through the slot 100 in the first section 76.

FIG. 7 illustrates the clamping plate 72 taken in cross-section along line 7—7 of FIG. 6. The first section 76 is somewhat T-shaped and is provided with the aforementioned slots 92, 94, and 100 which extend entirely through the first section. The slots 92, 94, and 100 may be counter-sunk within recesses 112, 114 and 116, respectively, but this is not required. The first section 76 is provided with a pair of vertical bores 118 and 120 which align with threaded vertical bores 122 and 124, respectively. When machine screws 80 are extended through bores 118 and 120 and are engaged with threaded bores 122 and 124, the recesses 82 and 84 clamp around the barrel 40 of the camera lens assembly to firmly hold the clamping plate 72 to the barrel 40.

FIG. 8 is a cross-section of carriage plate 70 as taken along line 8—8 of FIG. 6. The carriage plate is provided with three bores 126, 128, and 130. The guides 59 are attached within the bores 126 and 128 such as by a tight compression fit, keys, set screws, etc. The bore 130 is receptive to the portion of the focus adjustment screw 98 which is between the grooves 104. Bore 130 should be larger in diameter than the shaft diameter of screw 98 so that the shaft of the screw can rotate freely within the bore.

FIG. 9 is a cross-sectional view of the support member 66 as taken along line 9—9 of FIG. 6. The support member 66 includes three bores 132, 134, and 136 which preferably do not, but may, extend through the support member. Bores 132 and 134 are receptive to guides 59 and are preferably slightly larger in diameter than the guides so that the guides may freely slide therein. Bore 136 is threaded for engagement with the threaded portion 102 of focus adjustment screw 98.

The video camera 34 and camera focus mechanism 36 are assembled by first engaging the main body 38 with the channel member 46 as described previously. Screws 80, 88 and 94 are loosened to engage the aperture of the clamping plate 72 with the barrel 40 of the video camera 34. Screws 80 are tightened first, and then screws 88 and 94 are tightened to properly align the clamping plate 72 with the barrel 40.

The focus of the video camera 34 is adjusted by engaging the head 106 of the focus adjusting screw 98 with an appropriate tool and rotating the screw 98 to cause the barrel 40 to move along the focusing axis $A_f$. If a hex head screw 98 is used, an appropriate tool is an Allen wrench, and if a slot-head screw 98 is used, an appropriate tool is a flat-bladed screwdriver.

In view of the foregoing, the method of the present invention involves engaging a focusing screw with a base and a clamping mechanism, positioning the barrel of a camera lens substantially parallel to the axis of rotation of the focussing screw, engaging the clamping mechanism with the barrel of the camera lens, and rotating the adjustment screw to focus the camera lens assembly. Other steps include adjusting the position of the clamping mechanism in a direction perpendicular to the axis of rotation of the screw and affixing the position of the clamping mechanism after it has been properly adjusted. The focusing screw is preferably rotated by an appropriate adjustment tool.

While this invention has been described in terms of several preferred embodiments, it is contemplated that alterations, modifications and permutations thereof will become apparent to those skilled in the art upon a reading of the specification and study of the drawings. It is therefore intended that the following appended claims include all such alterations, modifications and permutations as fall within the true spirit and scope of the present invention.

What is claimed is:

1. A camera focus adjustment mechanism comprising:
   base means;
   clamping means for securing a barrel of a camera lens assembly, said clamping means including a carriage plate and a clamping plate, wherein said clamping plate is arranged to secure the camera lens barrel and is adjustably coupled to said carriage plate such that said clamping plate can move in an adjustment direction substantially perpendicular to a focusing axis of said camera lens assembly; and
   screw means coupling said clamping means to said base means, said screw mean having an axis of rotation which is parallel to said focusing axis of said camera lens assembly, such that rotation of said screw means causes said camera lens assembly to move along said focusing axis in a direction substantially perpendicular to said adjustment direction.

2. A camera focus adjustment mechanism as recited in claim 1 wherein said carriage plate is coupled to said screw means.

3. A camera focus adjustment mechanism as recited in claim 2 wherein:
   said clamping plate includes at least one slot extending in said adjustment direction substantially perpendicular to said focusing axis; and
   the camera focus adjustment mechanism further includes a fastener for coupling the clamping plate and the carriage plate together, the fastener being arranged to pass through said slot to facilitate adjustments of said clamping plate relative to said carriage plate in the adjustment direction.

4. A camera focus adjustment mechanism as recited in claim 3 wherein said clamping plate is provided with a plurality of slots aligned with said adjustment direction and the camera focus adjustment mechanism further includes a plurality of fasteners engaged with said slots, said fasteners coupling said clamping plate to said carriage plate.

5. A camera focus adjustment mechanism as recited in claim 4 wherein said clamping plate is provided with a clamping aperture receptive to said barrel of said camera lens assembly.

6. A method for focusing a camera lens assembly supported by a camera focus adjustment mechanism as recited in claim 1, the method comprising the steps of:
   positioning the barrel of the camera lens assembly having a focusing axis such that said focusing axis is substantially parallel to said axis of rotation;
   engaging said clamping means with said barrel of said camera lens and adjusting the positioning of the barrel in an adjustment direction that is substantially perpendicular to the axis of rotation; and
   rotating said screw means to adjust said focus of said camera lens assembly.

7. A method for focusing a camera lens assembly as recited in claim 6 wherein said step of engaging said clamping means includes the step of adjusting the position of said clamping means in a direction substantially perpendicular to said axis of rotation.

8. A method for focusing a camera lens assembly as recited in claim 7 wherein said step of engaging said clamping means includes the step of affixing the position of said clamping means after said step of adjusting said position.

9. A camera focus adjustment mechanism comprising:
   base means:
   clamping means for securing a barrel of a camera lens assembly, said clamping means including a carriage plate and a clamping plate, wherein said clamping plate is arranged to secure the camera lens barrel and is adjustably coupled to said carriage plate such that said clamping plate can move in an adjustment direction substantially perpendicular to a focusing axis of said camera lens assembly and includes a first section coupled to said carriage plate, said first section having a first recess at a first edge thereof which forms a portion of said clamping aperture, and a second section coupled to said first section, said second section having a second recess at a second edge thereof which forms the remainder of said clamping aperture when said first edge and said second edge are in abutment; and
   screw means coupling said clamping means to said base means, said screw mean having an axis of rotation which is parallel to said focusing axis of said camera lens assembly, such that rotation of said screw means causes said camera lens assembly to move along said focusing axis in a direction substantially perpendicular to said adjustment direction.

10. A camera focus adjustment mechanism as recited in claim 9 further comprising means for attaching said first section to said second section.

11. A camera focus adjustment mechanism as recited in claim 10 wherein said carriage plate is provided with a bore through which said screw means extends without engaging said bore, and said screw means further having retaining means coupled to said screw means to engage said screw means with said carriage plate.

12. A camera focus adjustment mechanism as recited in claim 11 further comprising linear guide means having an axis parallel to said axis of rotation said linear guide means coupled between said carriage plate and said base means.

13. A camera focus adjustment mechanism as recited in claim 12 wherein said base means is provided with at least one guide bore, and wherein said linear guide means is attached to said carriage plate and slidingly engaged with said guide bore.

14. A camera focus adjustment mechanism as recited in claim 13 wherein said base means is provided with a threaded bore receptive to said screw means.

15. A camera focus adjustment mechanism as recited in claim 14 wherein said base means comprises a channel shaped base member and a support member attached to said base member, wherein said barrel of said camera lens assembly is positioned within said channel shaped base member, and wherein said support member is provided with said guide bore and said threaded bore.

16. A camera focus adjustment mechanism as recited in claim 15 wherein said screw means is provided with a head, and wherein said head is accessible through an aperture provided in said clamping plate.

* * * * *